US009973389B2

(12) United States Patent
Chintakunta et al.

(10) Patent No.: US 9,973,389 B2
(45) Date of Patent: May 15, 2018

(54) PROPAGATING LEAF COUNT INFORMATION TO FACILITATE SWITCHING BETWEEN A SEGMENTED TUNNEL AND A NON-SEGMENTED TUNNEL

(71) Applicant: Juniper Networks, Inc., Sunnyvale, CA (US)

(72) Inventors: Naga Hari Prasad V.V. Chintakunta, Bangalore (IN); Sudarsanan Codandam, Bangalore (IN); Vinod N. Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 160 days.

(21) Appl. No.: 14/976,825

(22) Filed: Dec. 21, 2015

(65) Prior Publication Data
US 2017/0180207 A1    Jun. 22, 2017

(51) Int. Cl.
*H04L 12/24* (2006.01)
*H04L 12/46* (2006.01)
(Continued)

(52) U.S. Cl.
CPC .......... *H04L 41/12* (2013.01); *H04L 12/1868* (2013.01); *H04L 12/1886* (2013.01);
(Continued)

(58) Field of Classification Search
CPC ... H04L 12/4633; H04L 41/12; H04L 47/806; H04L 47/125; H04L 45/04; H04L 45/16; H04L 47/35; H04L 43/16; H04L 12/1868; H04L 12/1886; H04L 47/15; H04L 45/50; H04L 12/18; H04L 12/4641; H04L 12/185; H04L 45/124; H04L 45/02; H04L 47/10
See application file for complete search history.

(56) References Cited

U.S. PATENT DOCUMENTS 7,756,072 B1 *  7/2010  Fenner ................ H04L 12/1886
                                                   370/256
8,571,029 B1   10/2013  Aggarwal et al.
(Continued)

OTHER PUBLICATIONS

Rekhter et al., "Inter-Area P2MP Segmented LSPs", May 14, 2013, IETF, Network Working Group Internet Draft.*
Rosen et al., "Multicast in MPLS/BGP IP VPNs", Feb. 2012, IETF, RFC6513.*
Juniper Networks, "Understanding JUNOS Next-Generation Multicast VPNs," https://kb.juniper.net/library/CUSTOMERSERVICE/GLOBAL_JTAC/technotes/2000320-en.pdf, Aug. 15, 2009, 45 pages.
(Continued)

*Primary Examiner* — Paul H Masur
*Assistant Examiner* — Michael Phillips
(74) *Attorney, Agent, or Firm* — Harrity & Harrity, LLP

(57) ABSTRACT

A device may provide information associated with initiating a segmented tunnel to be used to transfer multicast traffic via a network covering a plurality of areas. The device may receive acknowledgement information associated with the segmented tunnel. The acknowledgement information may include information that identifies a number of egress devices, associated with at least one area of the plurality of areas, that are to receive the multicast traffic. The device may determine, based on the acknowledgement information, a total number of egress devices that are to receive the multicast traffic. The device may selectively provide the multicast traffic via the segmented tunnel based on the total number of egress devices that are to receive the multicast traffic.

20 Claims, 10 Drawing Sheets

(51) Int. Cl.
*H04L 12/927* (2013.01)
*H04L 12/18* (2006.01)
*H04L 12/801* (2013.01)

(52) U.S. Cl.
CPC .......... *H04L 12/4633* (2013.01); *H04L 47/15* (2013.01); *H04L 47/806* (2013.01)

(56) References Cited

U.S. PATENT DOCUMENTS

| | | |
|---|---|---|
| 9,148,364 B2 | 9/2015 | Venkataraman et al. |
| 2015/0092569 A1* | 4/2015 | Venkataraman ...... H04L 47/125 370/248 |
| 2016/0043876 A1* | 2/2016 | Kotalwar ................ H04L 12/18 370/235 |

OTHER PUBLICATIONS

Rekhter et al., "Inter-Area Point-to-Multipoint (P2MP) Segmented Label Switched Paths (LSPs)," https://tools.ietf.org/rfc/rfc7524.txt, May 13, 2015, 39 pages.

Rosen et al., "Multicast in MPLS/BGP IP VPNs," https://tools.ietf.org/rfc/rfc6513.txt, Feb. 20, 2012, 81 pages.

Aggarwal et al., "BGP Encodings and Procedures for Multicast in MPLS/BGP IP VPNs," https://tools.ietf.org/rfc/rfc6514.txt, Feb. 20, 2012, 55 pages.

Rosen et al., "Ingress Replication Tunnels in Multicast VPN; draft-ietf-bess-ir-02", BESS Working Group, Oct. 15, 2015, 22 pages, XP015109014.

Extended European Search Report corresponding to EP 16 15 5544, dated May 11, 2017, 13 pages.

\* cited by examiner

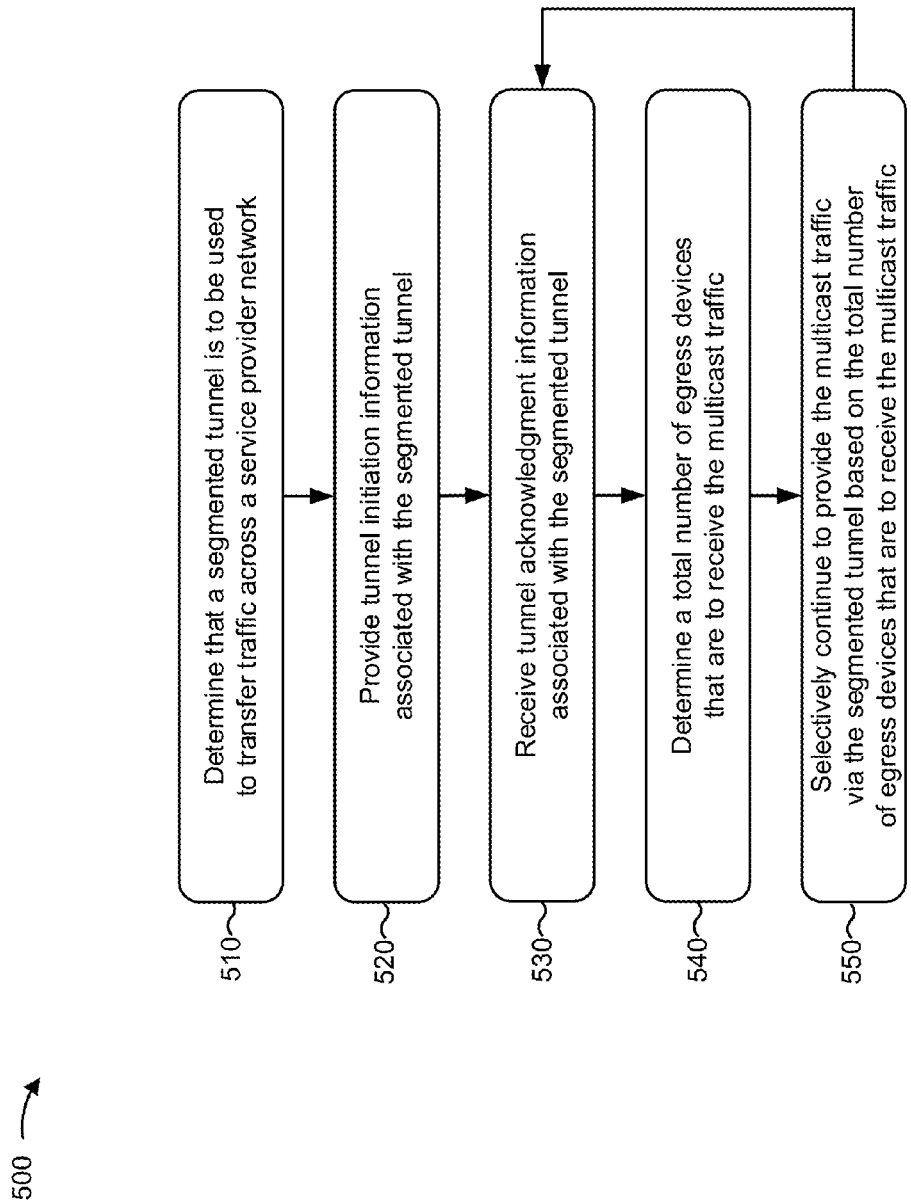

PROPAGATING LEAF COUNT INFORMATION TO FACILITATE SWITCHING BETWEEN A SEGMENTED TUNNEL AND A NON-SEGMENTED TUNNEL

BACKGROUND

A P-tunnel is a transport mechanism for forwarding multicast traffic (e.g., multicast virtual private network (MVPN) traffic) across a service provider network. A P-tunnel may be inclusive or selective. An inclusive P-tunnel enables an ingress provider edge (PE) device (e.g., an edge router), associated with a source of the multicast traffic, to transmit the multicast traffic to all egress PE devices that are members of a MVPN domain. A selective P-tunnel enables the ingress PE device to transmit the multicast traffic to a subset of the egress PE devices.

SUMMARY

According to some possible implementations, a device may include one or more processors to: provide information associated with initiating a segmented tunnel to be used to transfer multicast traffic via a network covering a plurality of areas; receive acknowledgement information associated with the segmented tunnel, where the acknowledgement information may include information that identifies a number of egress devices, associated with at least one area of the plurality of areas, that are to receive the multicast traffic; determine, based on the acknowledgement information, a total number of egress devices that are to receive the multicast traffic; and selectively provide the multicast traffic via the segmented tunnel based on the total number of egress devices that are to receive the multicast traffic.

According to some possible implementations, a non-transitory computer-readable medium may store instructions that, when executed by one or more processors, cause the one or more processors to: provide initiation information associated with a segmented tunnel to be used to transfer multicast traffic via a network that spans a plurality of areas; receive acknowledgement information, associated with the segmented tunnel, that includes information that identifies a number of egress provider edge (PE) devices, associated with an area of the plurality of areas, that are interested in receiving the multicast traffic; determine, based on the acknowledgement information, a total number of egress PE devices that are interested in receiving the multicast traffic; and determine whether to provide the multicast traffic via the segmented tunnel based on the total number of egress PE devices that are interested in receiving the multicast traffic.

According to some possible implementations, a method may include: providing, by device, information associated with a segmented tunnel associated with transferring traffic via a network, where the network may cover a plurality of areas; receiving, by the device and based on providing the information associated with the segmented tunnel, information that identifies a number of devices, associated with one or more areas of the plurality of areas, that are to receive the traffic; determining, by the device and based on the number of devices that are to receive the traffic, a total number of devices that are to receive the traffic; and selectively providing, by the device, the traffic via the segmented tunnel based on the total number of devices that are to receive the traffic.

BRIEF DESCRIPTION OF THE DRAWINGS

FIG. 5 is a flow chart of an example process for selectively continuing to provide multicast traffic using a segmented tunnel based on a total number of egress PEs interested in receiving multicast traffic.

DETAILED DESCRIPTION

Figure 1A:
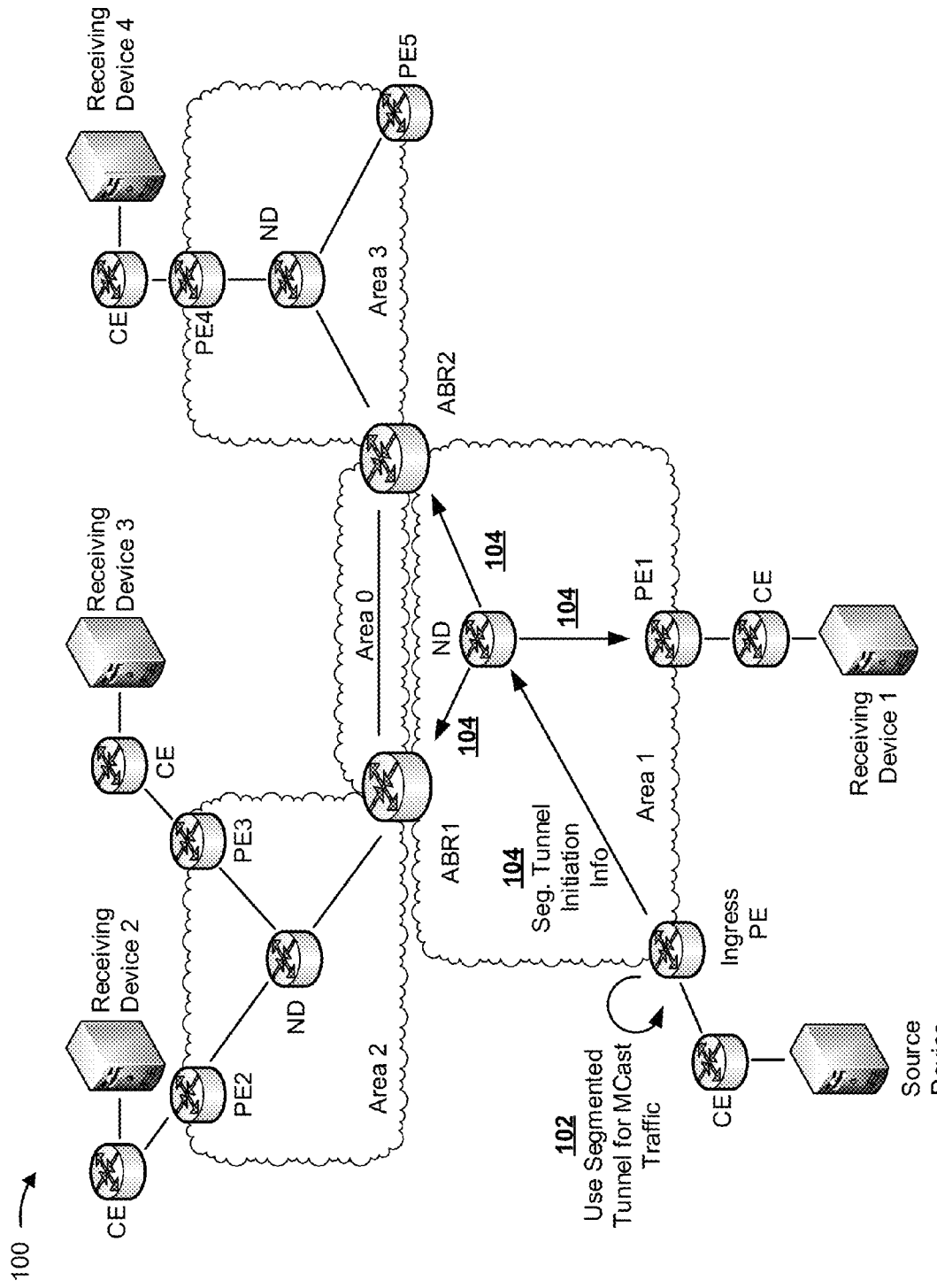
FIGS. 1A-1E are diagrams of an overview of an example implementation described herein.

The following detailed description of example implementations refers to the accompanying drawings. The same reference numbers in different drawings may identify the same or similar elements.

A service provider network may cover multiple areas, where each area may include a set of devices that is administratively grouped together, such as a set of devices associated with an autonomous system (AS). For example, a given area may include one or more PE devices (e.g., one or more routers positioned at an edge of the service provider network to allow for communication with one or more customer edge (CE) devices), one or more area border routers (ABRs) (e.g., one or more routers positioned at edges of two or more areas of the service provider network to allow for inter-area communication), one or more network devices (e.g., one or more routers positioned within the area to allow for intra-area communication between PE devices and/or ABRs associated with the area), or the like.

In order to allow multicast traffic to be provided across the service provider network, a selective P-tunnel may be initiated across multiple areas of the service provider network. For example, an ingress PE device (herein referred to as an ingress PE) may determine which egress PE devices (herein referred to as egress PEs), of multiple egress PEs associated with one or more areas of the service provider network, are interested in receiving the multicast traffic. In other words, the ingress PE may determine which egress PEs are to receive the multicast traffic (e.g., based on the egress PEs advertising an interest in the multicast traffic). Here, the ingress PE may set up a selective P-tunnel that causes only the interested egress PEs to receive the multicast traffic. In some implementations, the selective P-tunnel may be initiated as a non-segmented P-tunnel that spans multiple areas of the service provider network. In other words, the P-tunnel may be initiated such that a single P-tunnel acts as a single tunnel across the multiple areas of the service provider network.

However, as a number of egress PEs interested in receiving the multicast traffic increases, the burden on the ingress PE and/or transit devices (e.g., P-routers, ABRs 235, etc.) increases. For example, as the number of interested egress PEs increases, the ingress PE may need to store an increasing amount of control plane information associated with the non-segmented P-tunnel, which may consume a significant amount of resources of the ingress PE (e.g., memory resources, processing resources, etc.). As another example, as the number of interested egress PEs increases, the ingress PEs and transit devices may need to maintain an increasing number of signaling states associated with the non-segmented P-tunnel. Moreover, a signaling protocol, associated with communications between areas of the service provider network, may need to be consistent across the areas of the service provider network (e.g., which may be undesirable when use of different signaling protocols would simplify provisioning of the multicast traffic).

In order to address these issues, the ingress PE may reinitiate the selective P-tunnel as a segmented P-tunnel (rather than a non-segmented P-tunnel). For example, the ingress PE may cause the P-tunnel to be reinitiated such that a first segment of the P-tunnel transfers the multicast traffic across a first area of the service provider network, a second segment of the P-tunnel transfers the multicast traffic across a second area of the service provider network, and so on. Use of a segmented P-tunnel may reduce and/or distribute an amount of resources consumed by the ingress PE and/or the transit devices. Moreover, use of the segmented P-tunnel may allow different signaling protocols to be used on different areas of the service provider network.

However, it may be advantageous to reinitiate the non-segmented P-tunnel (i.e., to switch the segmented P-tunnel back to a non-segmented P-tunnel) when, for example, the number of egress PEs changes (e.g., decreases) such that maintaining the non-segmented P-tunnel would consume a smaller amount of resources and/or operate more efficiently than maintaining the segmented P-tunnel. Unfortunately, the ingress PE may be unable to determine the number of egress PEs interested in receiving the multicast traffic after the ingress PE has reinitiated the non-segmented P-tunnel as a segmented P-tunnel (i.e., the ingress PE may be unable to determine a number of egress PEs interested in receiving the traffic via the segmented P-tunnel).

For example, assume that the ingress PE is at a first edge of a first area of the service provider network, and that a group of egress PEs is positioned at a second edge of a second area of the service provider network. Finally, assume that an ABR is positioned at the first and second edges of the first area and the second area, respectively (i.e., the ABR is positioned between the ingress PE and the group of egress PEs). Here, a first segment of the segmented P-tunnel may traverse the first area (e.g., from the ingress PE to the ABR) and a second segment of the segmented P-tunnel may traverse the second area (e.g., from the ABR to each of the group of egress PEs). During initiation of the segmented P-tunnel, the ABR may determine that each of the group of egress PEs is interested in receiving the multicast traffic. However, when providing information, associated with initiating the segmented P-tunnel, to the ingress PE, the ABR may not provide, to the ingress PE, information that identifies the number of interested egress PEs.

Moreover, if the number of interested egress PEs changes (e.g., increases or decreases) after initiation of the segmented P-tunnel, the ABR may not provide, to the ingress PE, information indicating that the number of interested egress PEs has changed. As such, the ingress PE may be unable to determine the number of interested egress PEs after initiation of the segmented tunnel. Thus, the ingress PE may be unable to determine whether to reinitiate the segmented P-tunnel as a non-segmented P-tunnel (i.e., to switch the segmented P-tunnel back to a non-segmented P-tunnel), which may result in wasted resources associated with maintaining the segmented P-tunnel.

Implementations described herein may allow an ingress PE to determine a number of egress PEs, interested in receiving multicast traffic, after a segmented P-tunnel has been initiated to transfer the multicast traffic. As such, the ingress PE may be capable of determining whether to reinitiate the P-tunnel as a non-segmented P-tunnel, or continue using the segmented P-tunnel for transfer of the multicast traffic. In this way, an amount of resources, associated with transferring the multicast traffic via the P-tunnel, may be used efficiently.

Notably, while techniques described herein are described in the context of P-tunnels used to transfer multicast traffic, these techniques may be applied to other types of tunnels associated with transferring multicast traffic.

FIGS. 1A-1E are diagrams of an overview of an example implementation 100 described herein. For the purposes of example implementation 100, assume that a service provider network spans a set of areas (e.g., area 1, area 2, and area 3). As shown in FIG. 1A, area 0 may include a backbone area that includes a connection between a first ABR (e.g., ABR1) and a second ABR (e.g., ABR2).

As further shown, area 1 may include a network device (e.g., ND), an ingress PE, a first egress PE (e.g., PE1), ABR1 (e.g., positioned at edges of area 1 and area 2), and ABR2 (e.g., positioned at edges of area 1 and area 3). As further shown, a source device (e.g., associated with providing multicast traffic) may be connected to the ingress PE (e.g., via a CE device), and a first receiving device (e.g., receiving device 1) may be connected to PE1 (e.g., via a CE device).

As further shown, area 2 may include a network device (e.g., ND), a second egress PE (e.g., PE2), a third egress PE (e.g., PE3), and ABR1. As shown, a second receiving device (e.g., receiving device 2) may be connected to PE2 (e.g., via a CE device), and a third receiving device (e.g., receiving device 3) may be connected to PE3 (e.g., via a CE device).

As further shown, area 3 may include a network device (e.g., ND), a fourth egress PE (e.g., PE4), a fifth egress PE (e.g., PE5), and the ABR2. As shown, a fourth receiving device (e.g., receiving device 4) may be connected to PE4 (e.g., via a CE device).

As shown by reference number 102, the ingress PE may determine that a segmented P-tunnel is to be used to transfer the multicast traffic via the service provider network. In some implementations, the ingress PE may determine that a segmented tunnel is to be used based on a total number of egress PEs that are interested in receiving the multicast traffic, which may be determined by the ingress PE during initiation of a non-segmented P-tunnel associated with transferring the multicast traffic.

As shown by reference number 104, based on determining the multicast traffic is to be provided via a segmented P-tunnel, the ingress PE may provide tunnel initiation information associated with initiating the segmented P-tunnel. In some implementations, the tunnel initiation information may include a type 3 route (i.e., a selective provider multicast service interface (S-PMSI) auto-discovery (AD) route) that includes information associated with the multicast traffic (e.g., a customer multicast source address (C-S), a customer multicast group address (C-G), etc.). Additionally, or alternatively, the tunnel initiation information may include information indicating that the P-tunnel is to be initiated as a segmented P-tunnel (e.g., rather than a non-segmented P-tunnel). For example, the tunnel initiation information may include an extended community value, such as a segment next hop ID value, that includes information that identifies the ingress PE. Here, based on the segment next hop ID value including information that identifies the ingress device, one or more devices (e.g., ABR1 and ABR2) may determine that the tunnel is to be a segmented P-tunnel. As shown, the ingress PE may provide the tunnel initiation information such that the tunnel initiation information is received by ABR1, ABR2, and PE1.

Figure 1B:
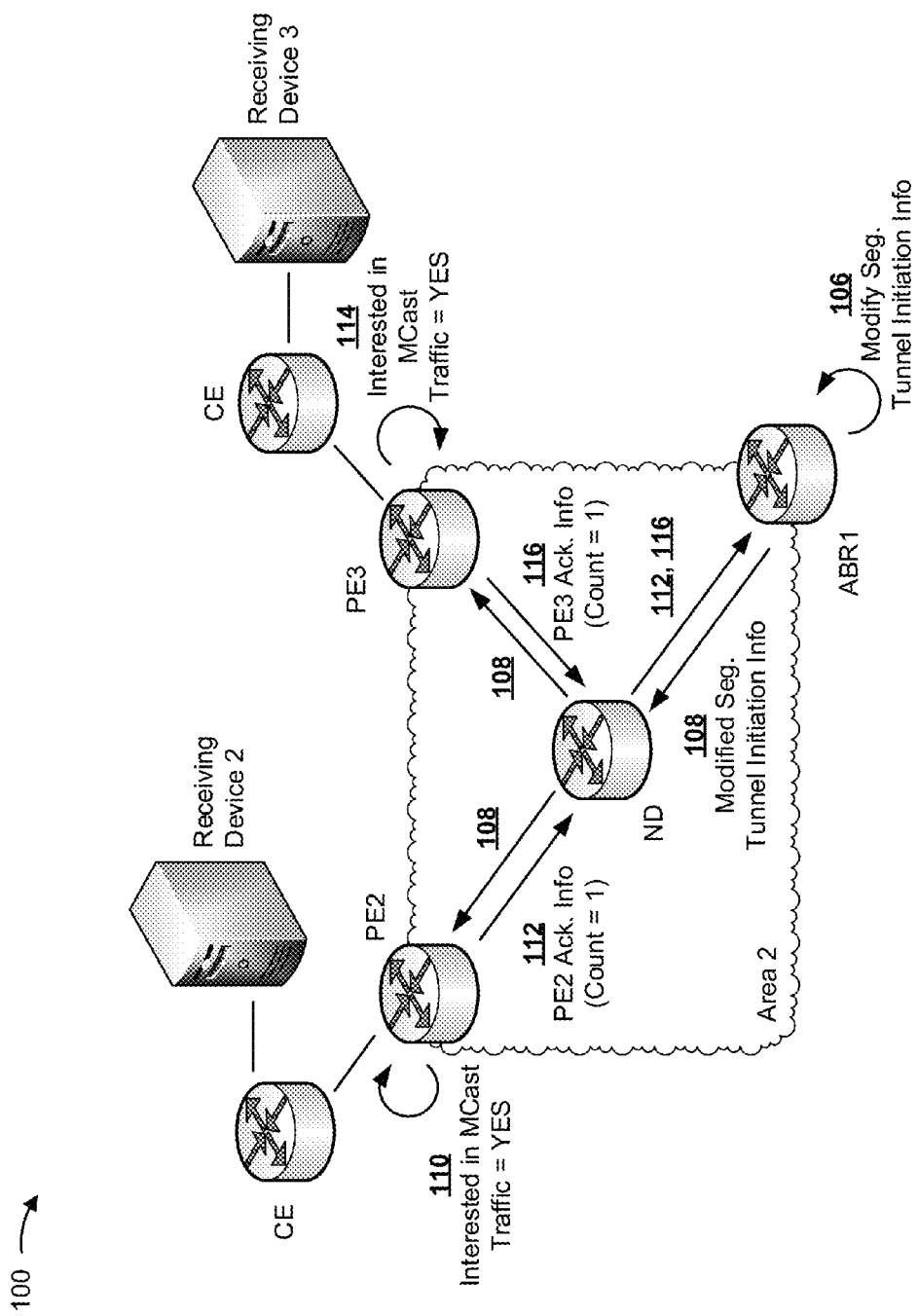

As shown in FIG. 1B, and by reference number 106, ABR1 may receive the tunnel initiation information, may determine that the tunnel is to be initiated as a segmented P-tunnel, and may modify the tunnel initiation information to create modified tunnel initiation information. In some implementations, ABR1 may modify the segment next hop ID value to include information that identifies ABR1 (e.g., rather than the ingress device). Modifying the tunnel initiation information to identify ABR1 may cause a segmented P-tunnel to be initiated such that segmentations take place at ABR1.

As shown by reference number 108, ABR1 may provide the modified tunnel initiation information to PE2 and PE3 (e.g., via the area 2 network device). As shown by reference number 110, PE2 may receive the modified tunnel initiation information, and may determine, based on information stored or accessible by PE2, whether PE2 is interested in receiving the multicast traffic. In some implementations, PE2 may determine whether PE2 is interested in receiving the multicast traffic based on information indicating that receiving device 2 is to receive the multicast traffic. As shown, assume that PE2 determines that PE2 is interested in receiving the multicast traffic. As shown by reference number 112, PE2 may provide acknowledgment information to ABR1 (e.g., via the area 2 network device). In some implementations, the acknowledgement information may include a type 4 route (i.e., a leaf AD route) that indicates whether an egress PE is interested in receiving the multicast traffic. In some implementations, the acknowledgement information, associated with the segmented P-tunnel, may include an extended community value that indicates whether the egress PE is interested in receiving the multicast traffic. For example, as shown, the PE2 acknowledgement information may include a leaf count value that is set to a particular value (e.g., 1) in order to indicate that PE2 is interested in receiving the multicast traffic.

As shown by reference number 114, PE3 may similarly determine that PE3 is interested in receiving the multicast traffic (e.g., based on information indicating that receiving device 3 is to receive the traffic). As shown by reference number 116, PE3 may provide acknowledgement information, associated with the segmented P-tunnel, to ABR1. As shown, the PE3 acknowledgement information may include a leaf count value that is set to 1 in order to indicate that PE3 is interested in receiving the multicast traffic.

Figure 1C:
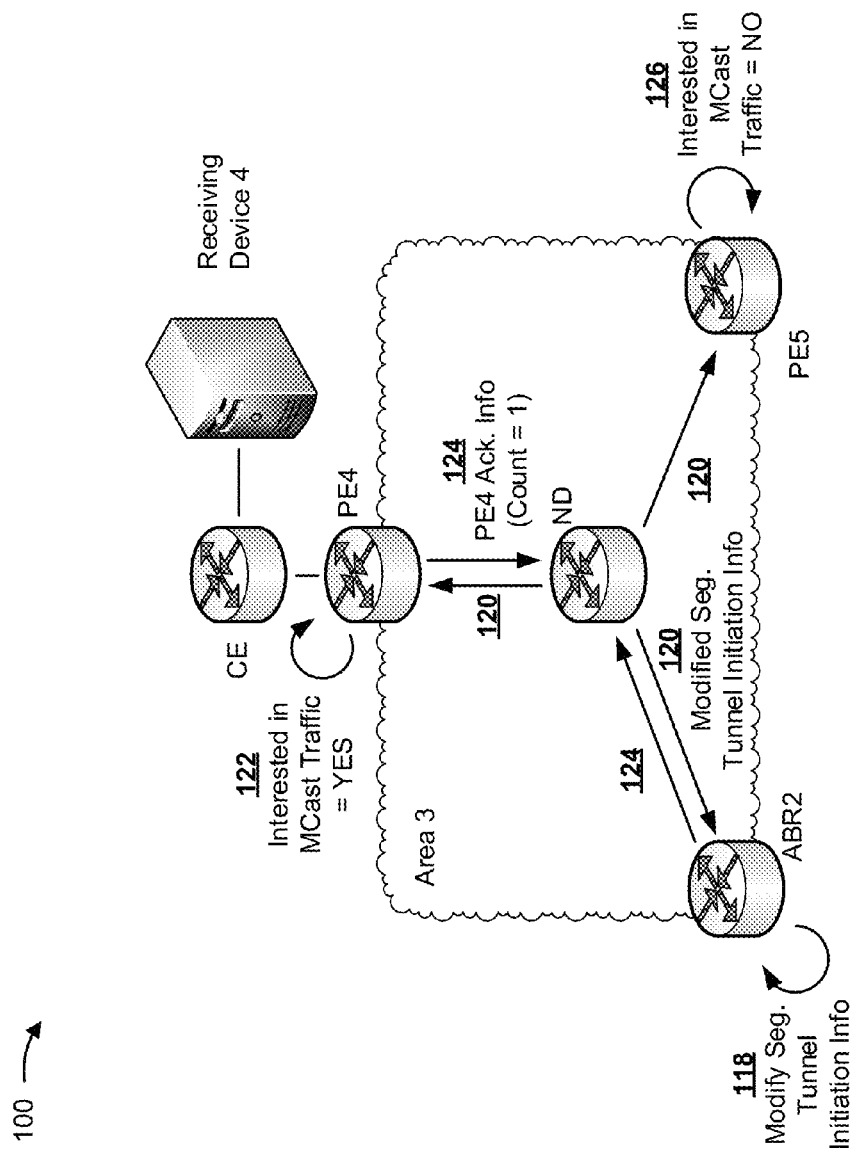

As shown in FIG. 1C, and by reference number 118, ABR2 may receive the tunnel initiation information, may determine that the tunnel is to be initiated as a segmented P-tunnel (e.g., in a manner similar to that as describe above with regard to ABR1), and may modify the tunnel initiation information to create modified tunnel initiation information. In some implementations, ABR2 may modify the segment next hop ID value to include information that identifies ABR2 (e.g., rather than the ingress device).

As shown by reference number 120, ABR2 may provide the modified tunnel initiation information to PE4 and PE5 (e.g., via the area 3 network device). As shown by reference number 122, PE4 may receive the modified tunnel initiation information, and may determine, based on information stored or accessible by PE4, that PE4 is interested in receiving the multicast traffic. As shown by reference number 124, PE4 may provide acknowledgement information, associated with the segmented P-tunnel, to ABR2. As shown, the PE4 acknowledgement information may include a leaf count value that is set to 1 in order to indicate that PE4 is interested in receiving the multicast traffic.

As shown by reference number 126, PE5 may determine that PE5 is not interested in receiving the multicast traffic (e.g., based on information indicating that no devices, connected to PE5, are to receive the multicast traffic). As shown, PE5 may not provide acknowledgment information associated with the segmented tunnel, since PE5 is not interested in receiving the multicast traffic. Alternatively, PE5 may provide acknowledgement information that includes a leaf count value that is set to 0 in order to indicate that PE5 is not interested in receiving the multicast traffic.

Figure 1D:
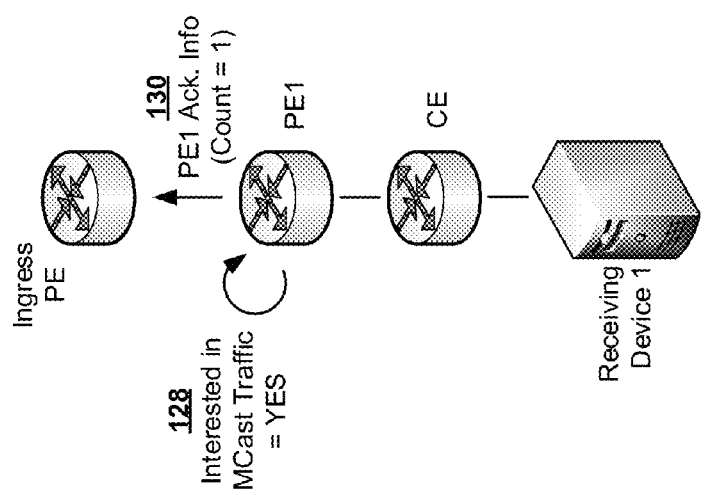

As shown in FIG. 1D, and by reference number 128, PE1 may receive the tunnel initiation information, and may determine, based on information stored or accessible by PE1, that PE1 is interested in receiving the multicast traffic. In this case, PE1 may receive the tunnel initiation information (rather than modified tunnel initiation information) since PE1 is included in a same area (e.g., area 1) as the ingress device. As shown by reference number 130, PE1 may provide acknowledgement information, associated with the segmented P-tunnel, to the ingress PE (e.g., since PE1 is included in the same area as the ingress PE). As shown, the PE1 acknowledgement information may include a leaf count value that is set to 1 in order to indicate that PE1 is interested in receiving the multicast traffic.

Figure 1E:
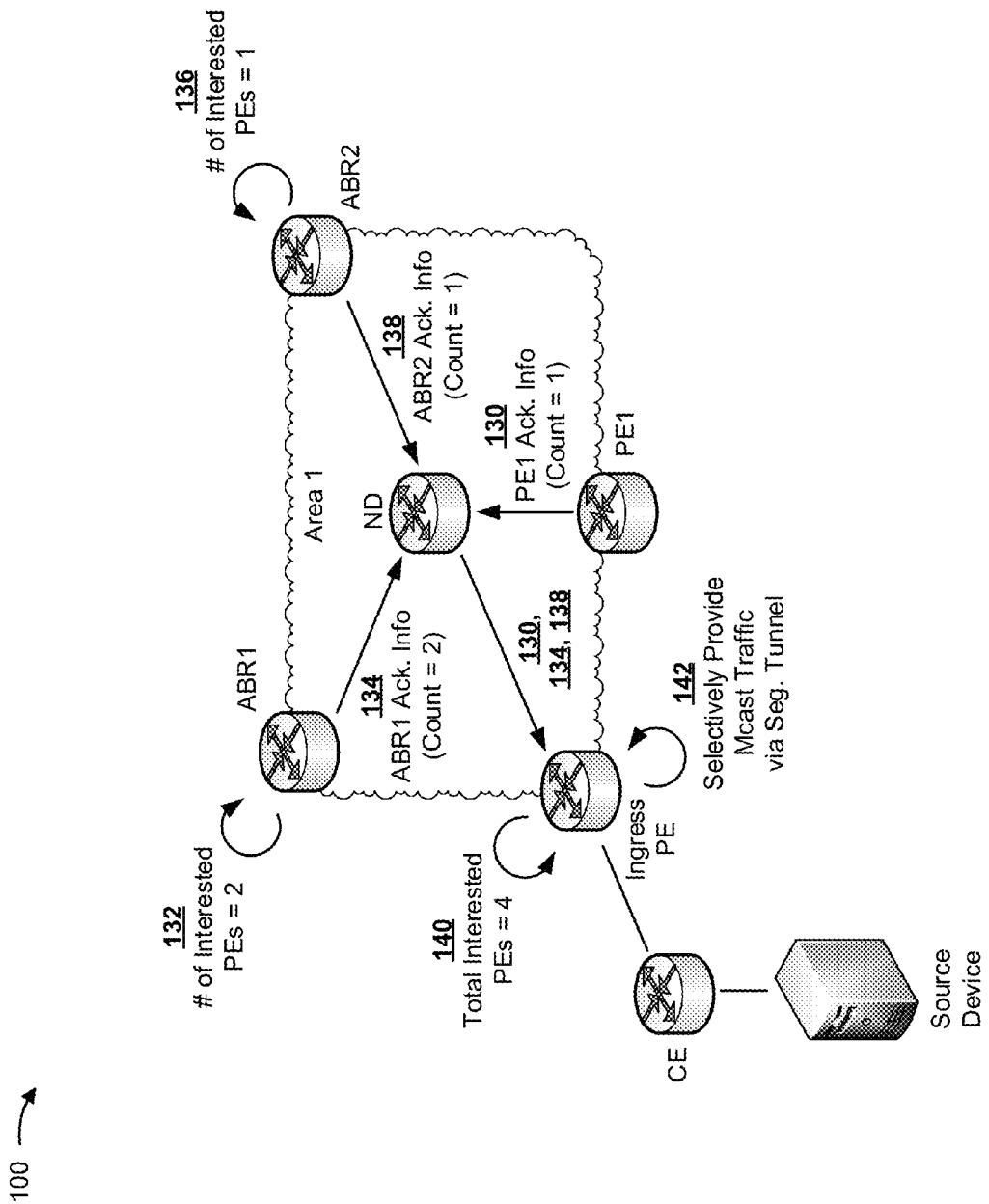

As shown in FIG. 1E, and by reference number 132, ABR1 may determine, based on the PE2 acknowledgement information and the PE3 acknowledgement information, a first number of egress PEs, associated with ABR1, that are interested in receiving the multicast traffic. As shown, ABR1 may determine that the first number of egress PEs is equal to two (e.g., since both PE2 and PE3 are interested in receiving the multicast traffic). As shown by reference number 134, ABR1 may provide acknowledgement information, associated with the segmented P-tunnel, to the ingress PE (e.g., via the area 1 network device). As shown, the ABR1 acknowledgement information may include information (e.g., a leaf count value set to 2) that identifies the first number of egress PEs (e.g., associated with area 2) that are interested in receiving the multicast traffic.

As shown by reference number 136, ABR2 may determine, based on the PE4 acknowledgement information and based on not receiving PE5 acknowledgement information, a second number of egress PEs, associated with ABR2, that are interested in receiving the multicast traffic. As shown, ABR2 may determine that the second number of egress PEs is equal to one (e.g., since only PE4 is interested in receiving the multicast traffic). As shown by reference number 138, ABR2 may provide acknowledgement information, associated with the segmented P-tunnel, to the ingress PE (e.g., via the area 1 network device). As shown, the ABR2 acknowledgement information may include information (e.g., a leaf count value set to 1) that identifies the second number of egress PEs (e.g., associated with area 3) that are interested in receiving the multicast traffic.

As shown by reference number 140, the ingress PE may receive the PE1 acknowledgement information, the ABR1 acknowledgement information, and the ABR2 acknowledgement information, and may determine (e.g., by adding the leaf count values) that a total number of egress PEs interested in receiving the multicast traffic is equal to four (e.g., PE1, PE2, PE3, and PE4).

As shown by reference number 142, the ingress PE may selectively provide the multicast traffic via the segmented P-tunnel based on the total number of egress PEs interested in receiving the multicast traffic. For example, if the total number of interested egress PEs satisfies (e.g., is greater than or equal to) a segmenting threshold, then the ingress PE may proceed with providing the multicast traffic via the segmented P-tunnel. Alternatively, if the total number of interested egress PEs does not satisfy (e.g., is less than) the segmenting threshold, then the ingress PE may reinitiate the P-tunnel as a non-segmented P-tunnel and proceed with providing the multicast traffic via the non-segmented P-tunnel.

In some implementations, the ingress PE may (e.g., periodically, based on a change in interest of an egress PE in receiving the multicast traffic, etc.) receive updated acknowledgement information associated with the segmented P-tunnel, and may selectively provide the multicast traffic via the segmented P-tunnel, accordingly. In other words, the ingress PE may switch between providing the traffic via a segmented P-tunnel and a non-segmented P-tunnel based on receiving updated acknowledgement information associated with the multicast traffic. For example, first updated acknowledgement information (e.g., received after the segmented P-tunnel is initiated) may identify a first updated total number of interested egress PEs that does not satisfy the segmenting threshold. Here, the ingress PE may switch the segmented P-tunnel back to a non-segmented P-tunnel. Continuing with this example, second updated acknowledgement information (e.g., received after the first updated acknowledgment information) may identify a second updated total number of interested egress PEs that (once again) satisfies the segmenting threshold. Here, the ingress PE may switch the non-segmented P-tunnel back to a segmented P-tunnel.

In this way, an ingress PE may determine a number of egress PEs, interested in receiving multicast traffic, after a segmented P-tunnel has been initiated to transfer the multicast traffic. This may allow the ingress PE to determine whether to reinitiate the P-tunnel as a non-segmented P-tunnel, or continue using the segmented P-tunnel for transfer of the multicast traffic.

As indicated above, FIGS. 1A-1E are provided merely as examples. Other examples are possible and may differ from what was described with regard to FIGS. 1A-1E.

Figure 2:
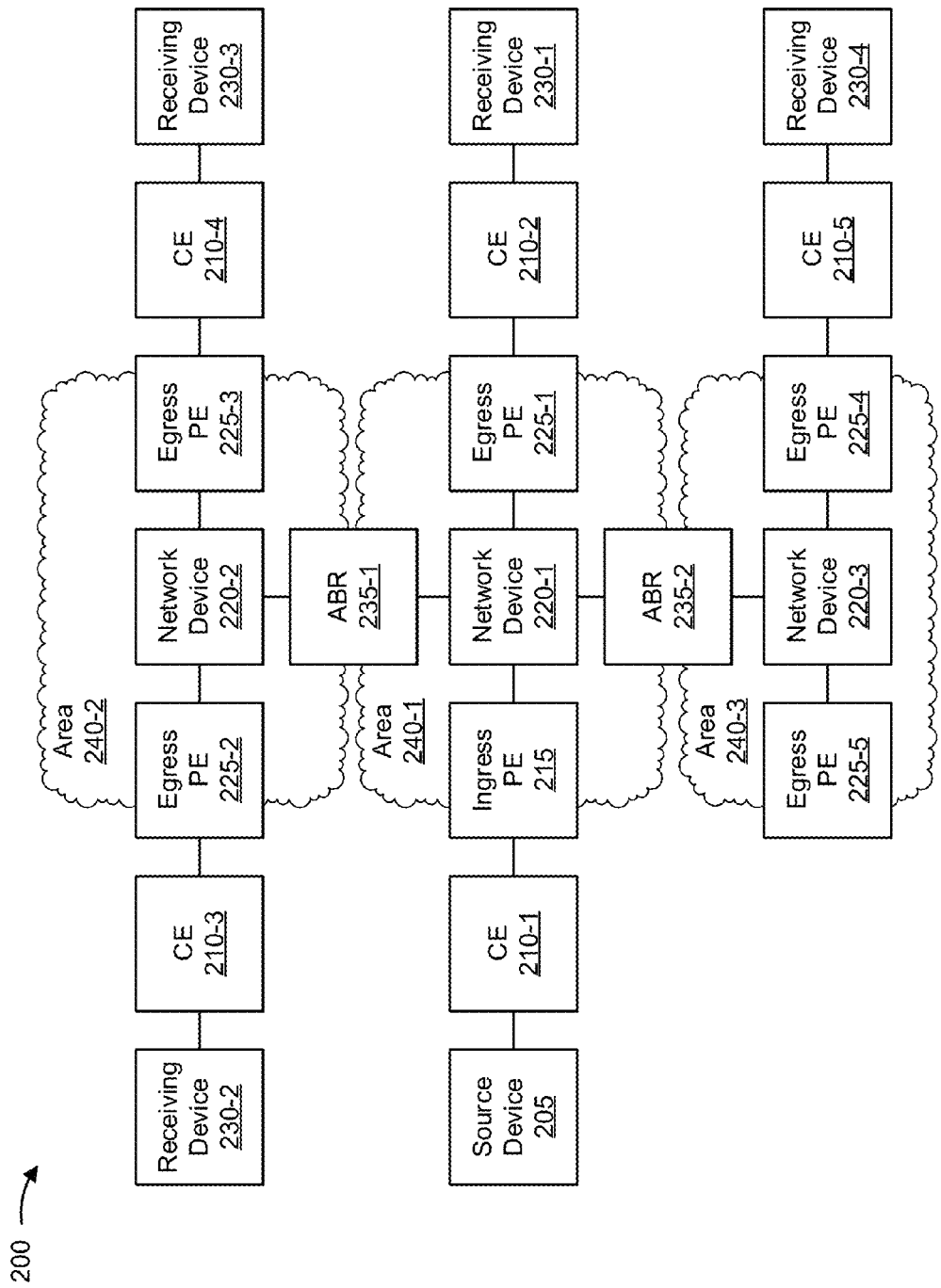
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a source device 205, one or more CEs 210 (e.g., CE 210-1 through CE 210-5), an ingress PE 215, one or more network devices 220 (e.g., network device 220-1 through network device 220-3), one or more egress PEs 225 (e.g., egress PE 225-1 through egress PE 225-5), one or more receiving devices 230 (e.g., receiving device 230-1 through receiving device 230-4), and one or more ABRs 235 (e.g., ABR 235-1 through ABR 235-2). As shown, ingress PE 215, network devices 220, egress PEs 225, and ABRs 235 may be positioned in a particular area 240 and/or on an edge of one or more areas 240 (e.g., area 240-1, area 240-2, area 240-3). Devices of environment 200 may interconnect via wired connections, wireless connections, or a combination of wired and wireless connections.

Source device 205 may include a device, associated with a customer network, capable of providing traffic that is to be multicast across a service provider network spanning areas 240 (i.e., multicast traffic). For example, source device 205 may include a server or a group of servers associated with the customer network. In some implementations, source device 205 may be capable of providing the multicast traffic to ingress PE 215 (e.g., via CE 210-1).

CE 210 may include a device, positioned at an edge of a customer network, that is capable of processing and/or transferring multicast traffic. For example, CE 210 may include a router, a gateway, a switch, a server, a modem, a network interface card (NIC), a hub, a bridge, an optical add-drop multiplexer (OADM), or the like. In some implementations, CE 210 may be capable of sending the multicast traffic to and/or receiving the multicast traffic from a device associated with the service provider network, such as ingress PE 215 and/or egress PE 225. Additionally, or alternatively, CE 210 (e.g., CE device-210-1) may be capable of receiving the multicast traffic from source device 205.

Ingress PE 215 may include a device, positioned at an edge of a service provider network, that is capable of providing the multicast traffic via a P-tunnel (e.g., a segmented P-tunnel or a non-segmented P-tunnel). For example, ingress PE 215 may include a router, a gateway, a switch, a server, a modem, a NIC, a hub, a bridge, an OADM, or the like. In some implementations, ingress PE 215 may be capable of determining a number of egress PEs 225 interested in receiving the multicast traffic and determining, based on the number of interested egress PEs 225, whether to initiate the P-tunnel as a segmented P-tunnel or a non-segmented P-tunnel. Additionally, or alternatively, ingress PE 215 may be capable of causing a segmented P-tunnel or a non-segmented P-tunnel to be initiated across one or more areas 240 of the service provider network. In some implementations, ingress PE 215 may be referred to as a root node.

Network device 220 may include a device, positioned within an area 240 of the service provider network, that is capable of receiving and providing the multicast traffic within the area 240 of the service provider network. For example, network device 220 may include a router, a gateway, a switch, a server, a modem, a NIC, a hub, a bridge, an OADM, or the like. In some implementations, network device 220 may be positioned between two or more other devices associated with the area 240 of the service provider network, as shown in FIG. 2.

Egress PE 225 may include a device, positioned at an edge of a service provider network, that is capable of receiving the multicast traffic via the P-tunnel and provide the multicast traffic to receiving device 230. For example, egress PE 225 may include a router, a gateway, a switch, a server, a modem, a NIC, a hub, a bridge, an OADM, or the like. In some implementations, egress PE 225 may be capable of determining whether one or more receiving devices 230, connected to egress PE 225, are to receive the multicast traffic.

Receiving device 230 may include a device, associated with the customer network, capable of receiving the multicast traffic. For example, receiving device 230 may include a server or a group of servers associated with the customer network. In some implementations, receiving device 230 may be capable of receiving the multicast traffic from egress PE 225 (e.g., via CE 210). Additionally, or alternatively, receiving device 230 may be capable of providing information indicating that receiving device 230 is to receive the multicast traffic.

ABR 235 may include a device, positioned at edges of two or more areas 240 of the service provider network, that is capable of receiving and providing the multicast traffic between areas 240. For example, ABR 235 may include a router, a gateway, a switch, a server, a modem, a NIC, a hub, a bridge, an OADM, or the like. In some implementations, ABR 235 may act as an initiation point and/or a termination point of one or more segments of a segmented P-tunnel. In some implementations, ABR 235 may be capable of determining whether one or more egress PEs 225, connected to ABR 235, are to receive the multicast traffic.

Area 240 may include an area of a service provider network that includes a set of devices that is administratively grouped together, such as a set of devices associated with an autonomous system (AS). For example, area 240 may include one or more devices of environment 200. In some implementations, the service provider network may cover and/or span multiple areas 240. In some implementations, a segment of a segmented P-tunnel may correspond to area 240.

The number and arrangement of devices and networks shown in FIG. 2 are provided as an example. In practice, there may be additional devices and/or areas, fewer devices and/or areas, different devices and/or areas, or differently arranged devices and/or areas than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Notably, while example environment 200 includes a particular number of source devices 205, CEs 210, ingress PEs 215, network devices 220, egress PEs 225, receiving devices 230, ABRs 235, and areas 240, the devices and areas of example environment 200 are provided for explanatory purposes. In other words, the number of source devices 205, CEs 210, ingress PEs 215, network devices 220, egress PEs 225, receiving devices 230, ABRs 235, and/or areas 240 may differ from that shown in example environment 200.

Figure 3A:
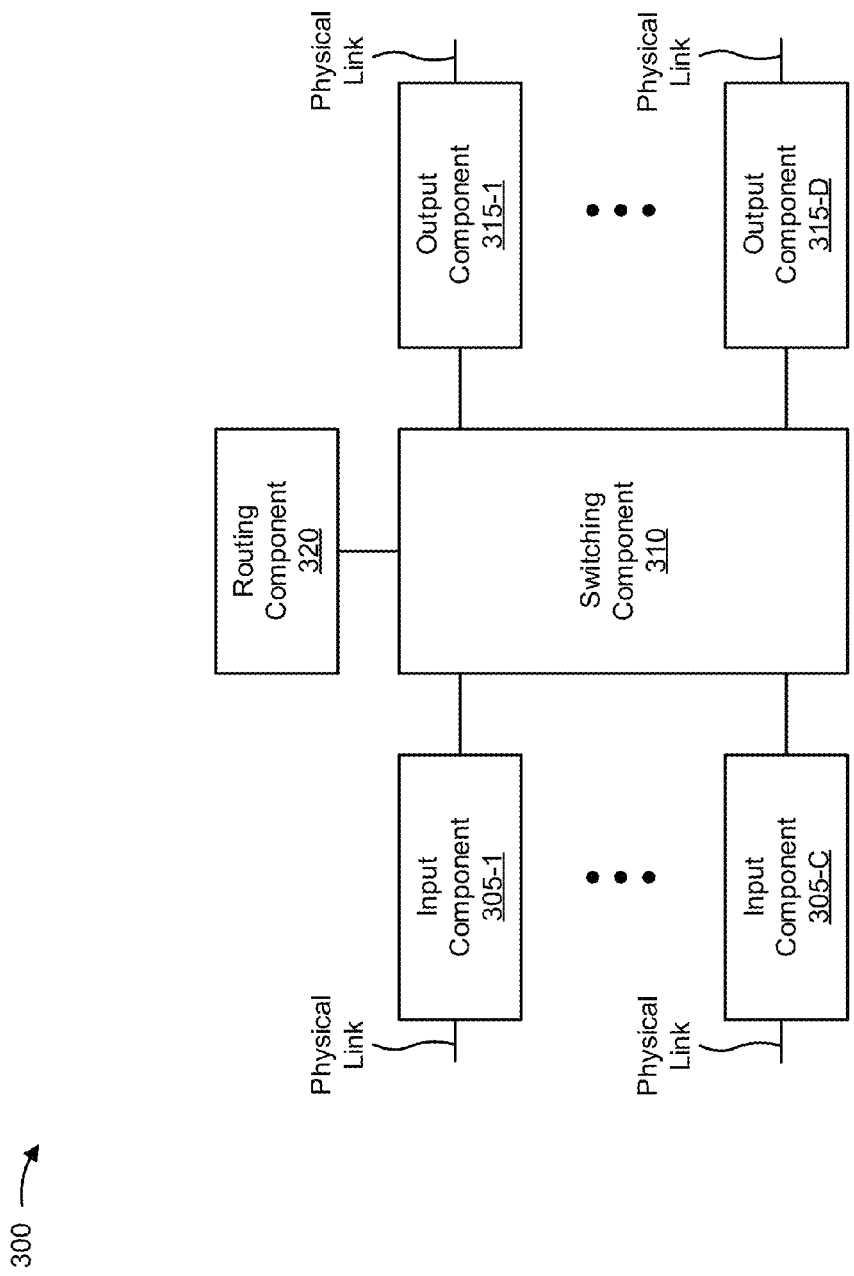
FIGS. 3A and 3B are diagrams of example components of one or more devices of FIG. 2.

FIG. 3A is a diagram of example components of a device 300. Device 300 may correspond to CE 210, ingress PE 215, network device 220, egress PE 225, and/or ABR 235. In some implementations, CE 210, ingress PE 215, network device 220, egress PE 225, and/or ABR 235 may include one or more devices 300 and/or one or more components of device 300. As shown in FIG. 3A, device 300 may include one or more input components 305-1 through 305-C (C≥1) (hereinafter referred to collectively as input components 305, and individually as input component 305), a switching component 310, one or more output components 315-1 through 315-D (D≥1) (hereinafter referred to collectively as output components 315, and individually as output component 315), and a routing component 320.

Input component 305 may include points of attachment for physical links and may be points of entry for traffic, such as packets. Input component 305 may process received traffic, such as by performing data link layer encapsulation or decapsulation. In some implementations, input component 305 may send packets to output component 315 via switching component 310.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for physical links and may be points of exit for traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

Routing component 320 includes a processor in the form of, for example, a central processing unit (CPU), a microprocessor, a field-programmable gate array (FPGA), an application-specific integrated circuit (ASIC), and/or another type of processor that can interpret and/or execute instructions. Routing component 320 is implemented in hardware, firmware, or a combination of hardware and software. In some implementations, routing component 320 may include one or more processors that can be programmed to perform a function.

In some implementations, routing component 320 may include a random access memory (RAM), a read only memory (ROM), and/or another type of dynamic or static storage device (e.g., a flash memory, a magnetic memory, an optical memory, etc.) that stores information and/or instructions for use by routing component 320.

In some implementations, routing component 320 may communicate with other devices, networks, and/or systems connected to device 300 to exchange information regarding network topology. Routing component 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Routing component 320 may perform one or more processes described herein. Routing component 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with routing component 320 from another computer-readable medium or from another device via a communication interface. When executed, software instructions stored in a memory and/or a storage component associated with routing component 320 may cause routing component 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
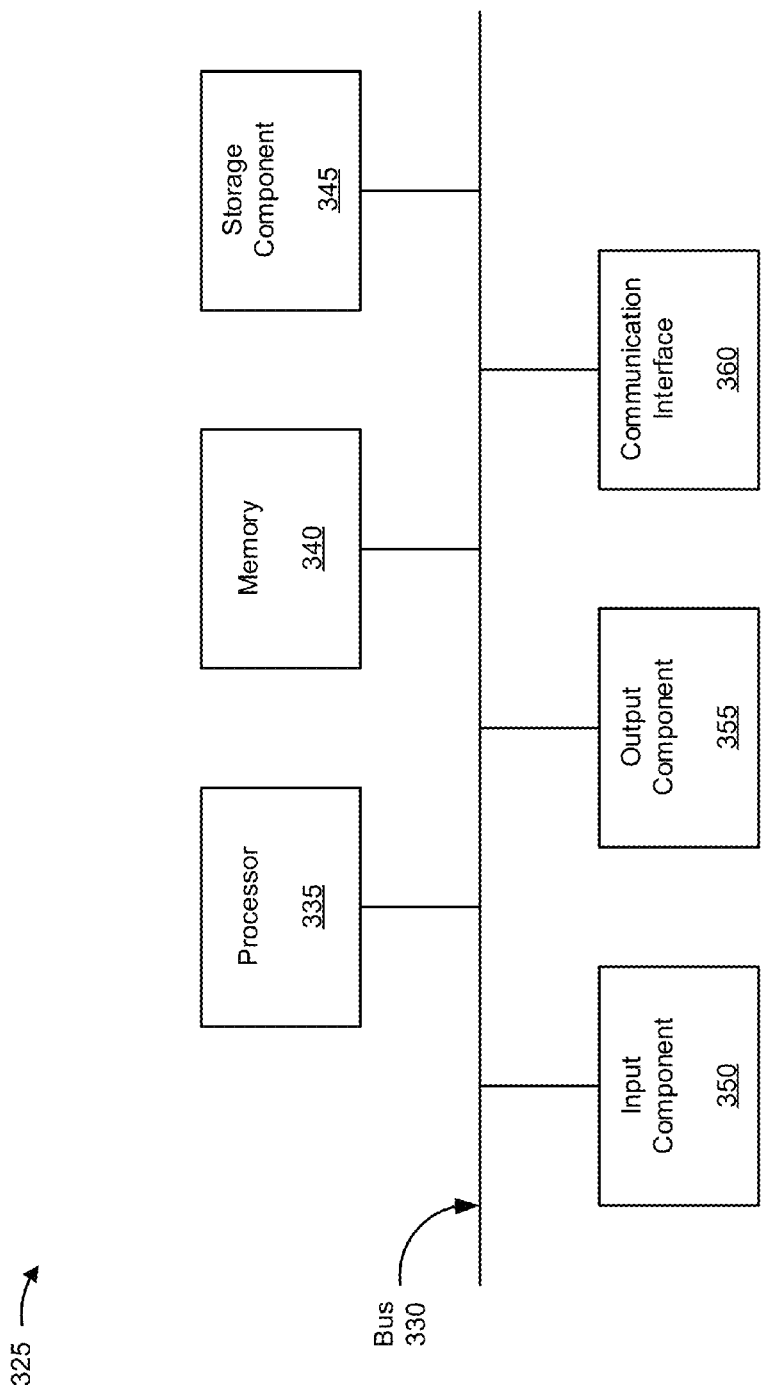

FIG. 3B is a diagram of example components of a device 325. Device 325 may correspond to source device 205 and/or receiving device 230. In some implementations, source device 205 and/or receiving device 230 may include one or more devices 325 and/or one or more components of device 325. As shown in FIG. 3B, device 325 may include a bus 330, a processor 335, a memory 340, a storage component 345, an input component 350, an output component 355, and a communication interface 360.

Bus 330 may include a component that permits communication among the components of device 325. Processor 335 is implemented in hardware, firmware, or a combination of hardware and software. Processor 335 may include a processor (e.g., a CPU, a GPU, an APU, etc.), a microprocessor, and/or any processing component (e.g., an FPGA, an ASIC, etc.) that interprets and/or executes instructions. In some implementations, processor 335 may include one or more processors that are programmed to perform a function. Memory 340 may include a random access memory (RAM), a read only memory (ROM), and/or another type of dynamic or static storage device (e.g., a flash memory, a magnetic memory, an optical memory, etc.) that stores information and/or instructions for use by processor 335.

Storage component 345 may store information and/or software related to the operation and use of device 325. For example, storage component 345 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 325 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 355 may include a component that provides output information from device 325 (e.g., a display, a speaker, one or more light-emitting diodes (LEDs), etc.).

Communication interface 360 may include a transceiver-like component (e.g., a transceiver, a separate receiver and transmitter, etc.) that enables device 325 to communicate with other devices, such as via a wired connection, a wireless connection, or a combination of wired and wireless connections. Communication interface 360 may permit device 325 to receive information from another device and/or provide information to another device. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 325 may perform one or more processes described herein. Device 325 may perform these processes in response to processor 335 executing software instructions stored by a non-transitory computer-readable medium, such as memory 340 and/or storage component 345. A computer-readable medium is defined herein as a non-transitory memory device. A memory device includes memory space within a single physical storage device or memory space spread across multiple physical storage devices.

Software instructions may be read into memory 340 and/or storage component 345 from another computer-readable medium or from another device via communication interface 360. When executed, software instructions stored in memory 340 and/or storage component 345 may cause processor 335 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as examples. In practice, device 325 may include additional components, fewer components, different components, or differently arranged components than those shown in FIG. 3B. Additionally, or alternatively, a set of components (e.g., one or more components) of device 325 may perform one or more functions described as being performed by another set of components of device 325.

Figure 4:
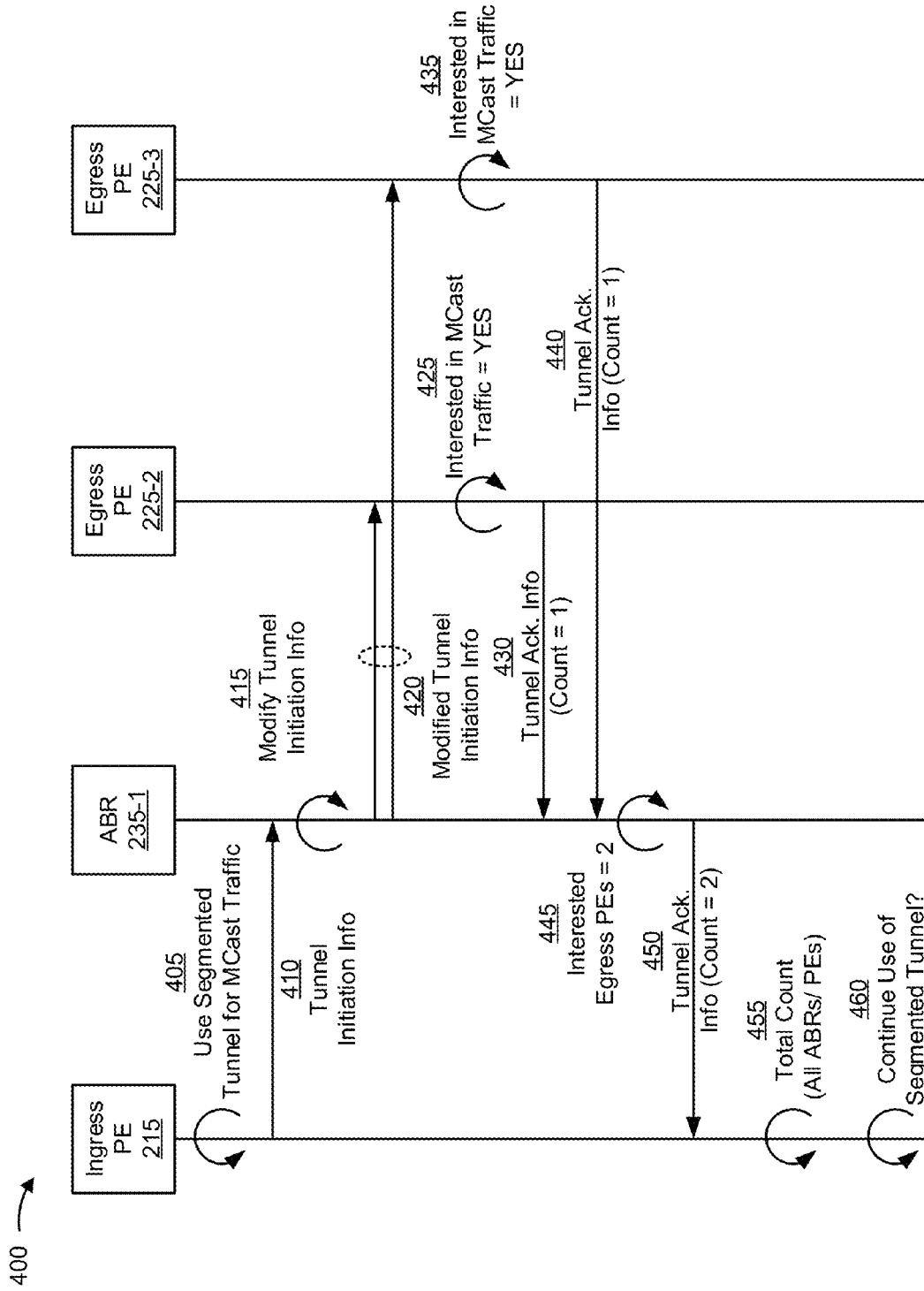
FIG. 4 is a call flow diagram of an example process for selectively continuing to provide multicast traffic using a segmented tunnel based on a total number of egress PEs interested in receiving multicast traffic.

FIG. 4 is a call flow diagram of an example process 400 for selectively continuing to provide multicast traffic using a segmented tunnel based on a total number of egress PEs interested in receiving multicast traffic. In some implementations, one or more operations of FIG. 4 may be performed by ingress PE 215, one or more ABRs 235, and one or more egress PEs 225. In some implementations, one or more operations of FIG. 4 may be performed by another device or a group of devices, such as one or more other devices of environment 200.

As shown in FIG. 4, process 400 may include determining that a segmented tunnel is to be used to transfer multicast traffic across a service provider network (reference number 405). For example, ingress PE 215 may determine that a segmented P-tunnel is to be used to transfer multicast traffic across a service provider network. In some implementations, ingress PE 215 may determine that a segmented P-tunnel is to be used to transfer the multicast traffic after ingress PE 215 determines, during or after initiation of a non-segmented P-tunnel, a total number of egress PEs 225 that are to receive the multicast traffic (i.e., a total number of egress PEs 225 that are interested in receiving the multicast traffic), as described below.

As described above, a segmented P-tunnel may include a P-tunnel comprised of segments, where each P-tunnel segment may traverse an area 240 of a service provider network. For example, with reference to FIG. 2, a first segment of a P-tunnel may correspond to area 240-1 (e.g., from ingress PE 215 to ABR 235-1, ABR 235-2, and/or egress PE 225-1), a second segment of the P-tunnel may correspond to area 240-2 (e.g., from ABR 235-1 to egress PE 225-2 and/or egress PE 225-3), and a third segment of the P-tunnel may correspond to area 240-3 (e.g., from ABR 235-2 to egress PE 225-4 and/or egress PE 225-5).

In some implementations, ingress PE 215 may determine that a segmented P-tunnel is to be used to transfer the multicast traffic based on a total number of egress PEs 225 interested in receiving the multicast traffic. For example, assume that ingress PE 215 receives an indication to initiate a non-segmented P-tunnel for transferring the multicast traffic (e.g., when ingress PE 215 is configured to initiate a non-segmented P-tunnel based on source device 205 indicating that source device 205 wishes to provide multicast traffic). Here, ingress PE 215 may initiate the non-segmented P-tunnel by providing tunnel initiation information associated with initiating the non-segmented P-tunnel. As a particular example, ingress PE 215 may provide, to one or more one or more egress PEs 225 (e.g., via one or more ABRs 235) tunnel initiation information in the form of a type 3 route (i.e., a S-PMSI AD route) that includes information associated with the multicast traffic (e.g., a C-S, a C-G, etc.).

In some implementations, the tunnel initiation information, associated with the non-segmented P-tunnel, may include information indicating that the P-tunnel is to be a non-segmented P-tunnel. For example, the tunnel initiation information may include an extended community value, such as a segment next hop ID value. Here, the segment next hop ID value may be set to a particular value (e.g., 0) in order to indicate that the P-tunnel is to be a non-segmented P-tunnel. In some implementations, each ABR 235 may forward, based on the information indicating that the P-tunnel is to be a non-segmented P-tunnel, the tunnel initiation information to egress PEs 225 (e.g., without modifying the tunnel initiation information, as described below with regard to initiating a segmented P-tunnel).

Here, each egress PE 225 may determine, based on the information associated with the multicast traffic and/or information associated with receiving device 230 that is to communicate via egress PE 225 (e.g., information indicating an interest in multicast traffic associated with the C-S and/or the C-G), whether egress PE 225 is interested in receiving the multicast traffic. Each interested egress PE 225 may then provide, to ingress PE 215, acknowledgement information in the form of a type 4 route (i.e., a leaf AD route) indicating whether the egress PE 225 is interested in receiving the multicast traffic. In this example, ingress PE 215 may receive (e.g., via the one or more ABRs 235) type 4 routes provided by egress PEs 225, and may determine a total number of egress PEs 225 that are interested in receiving the multicast traffic based on the number of type 4 routes, received by ingress PE 215, indicating an interest in the multicast traffic.

In some implementations, ingress PE 215 may determine that a segmented tunnel is to be used to transfer multicast traffic based on a segmenting threshold configured on ingress PE 215. Continuing with the above example, ingress PE 215 may be store or have access to a segmenting threshold that identifies a threshold number (e.g., 5, 10, 50, etc.) of egress PEs 225 that may receive multicast traffic via a non-segmented P-tunnel. In this example, if the total number of egress PEs 225 that are interested in receiving the multicast traffic satisfies (e.g., is greater than or equal) the segmenting threshold, then ingress PE 215 may determine that a segmented P-tunnel is to be used to transfer the multicast traffic. Alternatively, if the total number of egress PEs 225 that are interested in receiving the multicast traffic does not satisfy (e.g., is less than) the segmenting threshold, then ingress PE 215 may determine that the non-segmented P-tunnel (e.g., as already initiated by ingress PE 215) is to be used to transfer the multicast traffic.

Additionally, or alternatively, ingress PE 215 may determine that a segmented tunnel is to be used to transfer the multicast traffic in another manner, such as based on user input indicating that a segmented P-tunnel is to be used to transfer the multicast traffic.

As further shown in FIG. 4, process 400 may include providing tunnel initiation information associated with the segmented tunnel (reference number 410). For example, ingress PE 215 may provide tunnel initiation information associated with the segmented P-tunnel. In some implementations, ingress PE 215 may provide the tunnel initiation information when ingress PE 215 determines that a segmented P-tunnel is to be used to transfer the multicast traffic across the service provider network.

The tunnel initiation information, associated with the segmented P-tunnel, may include information associated with initiating a segmented P-tunnel across two or more areas 240 of the service provider network. For example, the tunnel initiation information, associated with the segmented P-tunnel, may include a type 3 route that includes the information associated with the multicast traffic (e.g., the C-S, the C-G, a multicast group identifier, etc.). In some implementations, the tunnel initiation information, associated with the segmented P-tunnel, may include information indicating that the P-tunnel is to be a segmented P-tunnel. For example, the segment next hop ID value, included in the type 3 route, may be set to a value that identifies ingress PE 215, such as a loopback address of ingress PE 215. Here, setting the segment next hop ID value to the information that identifies ingress PE 215 may indicate (e.g., to ABRs 235) that the P-tunnel is to be a segmented P-tunnel.

Additionally, or alternatively, the tunnel initiation information, associated with the segmented P-tunnel, may include tunnel configuration information that identifies a type of tunnel (e.g., a resource reservation protocol (RSVP) tunnel, a label distribution protocol (LDP) tunnel, etc.) that is to be used on a first segment of the segmented P-tunnel (e.g., the segment associated with area 240-1).

In some implementations, ingress PE 215 may provide the tunnel initiation information, associated with the segmented P-tunnel, to one or more devices of area 240 associated with ingress PE 215. For example, with reference to example environment 200, ingress PE 215 may provide (e.g., via network device 220-1) the tunnel initiation information, associated with the segmented P-tunnel, to ABR 235-1, ABR 235-2, and egress PE 225-1. Here, ABR 235-1, ABR 235-2, and egress PE 225-1 may receive the tunnel initiation information, associated with the segmented P-tunnel, based on the tunnel initiation information being provided by ingress PE 215.

Notably, while additional operations of example process 400 are described in the context of devices associated with area 240-2 of example environment 200 (e.g., ABR 235-1, egress PE 225-2, and egress PE 225-3), one or more operations of example process 400 may also apply to other devices associated with one or more other areas 240 of example environment 200, such as egress PE 225-1, egress PE 225-4, egress PE 225-5, ABR 235-2, or the like.

As further shown in FIG. 4, process 400 may include modifying the tunnel initiation information associated with the segmented tunnel (reference number 415). For example, ABR 235-1 may modify the tunnel initiation information associated with the segmented P-tunnel (herein referred to as segmented P-tunnel initiation information). In some implementations, ABR 235-1 may modify the segmented P-tunnel initiation information when ABR 235-1 receives the segmented P-tunnel initiation information from ingress PE 215. Additionally, or alternatively, ABR 235-1 may modify the segmented P-tunnel initiation information when ABR 235-1 determines that the segmented P-tunnel initiation information includes information indicating that the P-tunnel is to be a segmented P-tunnel, as described below.

In some implementations, ABR 235-1 may modify the segmented P-tunnel initiation information based on determining that the P-tunnel is to be a segmented P-tunnel. For example, ABR 235-1 may inspect the segmented P-tunnel initiation information, and may determine (e.g., based on the segment next hop ID field being set to the loopback address of ingress PE 215, rather than 0) that the P-tunnel is to be a segmented P-tunnel.

In some implementations, ABR 235-1 may determine that ABR 235-1 is to be a point at which the segmentation is to occur. For example, ABR 235-1 may be configured to determine (e.g., for any segmented P-tunnel) that ABR 235-1 is to act as a termination point for a first P-tunnel segment and an initiation point for a second P-tunnel. Additionally, or alternatively, the segmented P-tunnel initiation information may include information indicating that ABR 235-1 is to act as the termination point of the first segment and/or the initiation point of the second segment.

In some implementations, ABR 235-1 may modify the segmented P-tunnel initiation information by editing the information indicating that the P-tunnel is to be a segmented P-tunnel. For example, ABR 235-1 may modify the segment next hop ID value to include information that identifies ABR 235-1, such as a loopback address of ABR 235-1. In some implementations, modifying the segmented P-tunnel initiation information may cause a next segment (e.g., from ABR 235-1 to egress PE 225-2 and/or egress PE 225-3) to terminate at ABR 235-1 (e.g., rather than ingress PE 215).

Additionally, or alternatively, ABR 235-1 may modify the tunnel configuration information, included in the segmented P-tunnel initiation information, to identify a type of tunnel that is to be used on a second segment of the segmented P-tunnel (e.g., the segment associated with area 240-2). In this way, different signaling protocols may be used in different segments of the segmented P-tunnel.

As further shown in FIG. 4, process 400 may include providing the modified tunnel initiation information associated with the segmented tunnel (reference number 420). For example, ABR 235-1 may provide the modified segmented P-tunnel initiation information. In some implementations, ABR 235-1 may provide the modified segmented P-tunnel initiation information after ABR 235-1 modifies the segmented P-tunnel initiation information.

In some implementations, ABR 235-1 may provide the modified segmented P-tunnel initiation information (e.g., via network device 220-2) to egress PEs 225 associated with area 240-2 (i.e., egress PE 225-2 and egress PE 225-3). Here, egress PE 225-2 and egress PE 225-3 may receive the modified segmented P-tunnel initiation information based on ABR 235-1 providing the modified segmented P-tunnel initiation information.

As further shown in FIG. 4, process 400 may include determining whether a first egress PE is to receive the multicast traffic (reference number 425). For example, a first egress PE 225 (e.g., egress PE 225-2) may determine whether egress PE 225-2 is to receive the multicast traffic. In some implementations, egress PE 225-2 may determine whether egress PE 225-2 is to receive the multicast traffic when egress PE 225-2 receives the modified segmented P-tunnel initiation information provided by ABR 235-1.

In some implementations, egress PE 225-2 may determine whether egress PE 225-2 is to receive the multicast traffic based on information associated with receiving device 230-3. For example, receiving device 230-3 may provide information indicating that receiving device 230-3 is to receive multicast traffic associated with the C-S and/or the C-G included in the modified segmented P-tunnel initiation information. Here, egress PE 225-2 may determine, based on the information indicating that receiving device 230-3 is to receive multicast traffic associated with the C-S and/or the C-G, that egress PE 225-2 is interested in receiving the multicast traffic (e.g., such that the multicast traffic may be provided to receiving device 230-3). Alternatively, egress PE 225-2 may determine that egress PE 225-2 is not interested in receiving the multicast traffic (e.g., when receiving device 230, associated with egress PE 225-2, has not indicated that multicast traffic, associated with the C-S and/or the C-G, is to be received by receiving device 230).

In some implementations, egress PE 225-2 may update the determination of whether egress PE 225-2 is to receive the multicast traffic. For example, egress PE 225-2 may determine that egress PE 225-2 is to receive the multicast traffic at a first time (e.g., when the segmented P-tunnel is initiated), as described above. Here, egress PE 225-2 may determine whether egress PE 225-2 is to receive the multicast traffic at a later time, such as on a periodic basis (e.g., every 60 seconds, every 15 minutes, etc.), based on information provided by receiving device 230-3 (e.g., when receiving device 230-3 indicates that receiving device 230-3 is no longer to receive the multicast traffic associated with the C-S and/or the C-G, upon detecting a failure associated with receiving device 230-3, etc.), or the like.

As further shown in FIG. 4, process 400 may include providing first acknowledgement information, associated with the segmented tunnel, that includes information indicating whether the first egress PE is to receive the multicast traffic (reference number 430). For example, egress PE 225-2 may provide first acknowledgement information, associated with the segmented P-tunnel, indicating whether egress PE 225-2 is interested in receiving the multicast traffic. In some implementations, egress PE 225-2 may provide the first acknowledgement information after egress PE 225-2 determines whether egress PE 225-2 is to receive the multicast traffic.

The acknowledgement information, associated with the segmented P-tunnel, may include a type 4 route (i.e., a leaf AD route) that indicates whether egress PE 225-2 is interested in receiving the multicast traffic. In some implementations, the first acknowledgement information, associated with the segmented P-tunnel, may include an extended community value that indicates whether egress PE 225-2 is interested in receiving the multicast traffic. For example, the first acknowledgement information may include a leaf count value that is set to a particular value (e.g., 1) in order to indicate that egress PE 225-2 is to receive the multicast traffic. As an alternative example, the first acknowledgement information may include a leaf count value that is set to another particular value (e.g., 0) in order to indicate that egress PE 225-2 is not to receive the multicast traffic (e.g., when no receiving device 230, associated with egress PE 225-2, is to receive the multicast traffic).

In some implementations, multiple items of acknowledgement information (e.g., multiple leaf count values), associated with multiple egress PEs 225, may be used to by ingress PE 215 to determine whether to continue providing the multicast traffic via the segmented P-tunnel, as described below.

In some implementations, egress PE 225-2 may provide updated first acknowledgement information associated with egress PE 225-2. For example, egress PE 225-2 may repeat the determination of whether egress PE 225-2 is interested in receiving the multicast traffic, as described above. Here, based on the repeated determination, egress PE 225-2 may provide updated first acknowledgement information, associated with the segmented P-tunnel, indicating (e.g., via the leaf count value) whether egress PE 225-2 is interested in receiving the multicast traffic or is no longer interested in receiving the multicast traffic.

In some implementations, egress PE 225-2 may provide the first acknowledgement information to ABR 235-1. For example, egress PE 225-2 may provide the first acknowledgement information to ABR 235-1 based on the segment next hop ID value, included in the modified segmented P-tunnel initiation information, that identifies ABR 235-1. Here, ABR 235-1 may receive the first acknowledgement information based on egress PE 225-2 providing the first acknowledgement information. For the purposes of example process 400, assume that egress PE 225-2 provides first acknowledgement information indicating that egress PE 225-2 is interested in receiving the multicast traffic (e.g., that a leaf count value in the type 4 route provided by egress PE 225-2 is set to 1).

As further shown in FIG. 4, process 400 may include determining whether a second egress PE is to receive the multicast traffic (reference number 435). For example, a second egress PE 225 (e.g., egress PE 225-3) may determine whether egress PE 225-3 is to receive the multicast traffic in a manner similar to that described above with regard to the operation at reference number 425.

As further shown in FIG. 4, process 400 may include providing second acknowledgement information, associated with the segmented tunnel, that includes information indicating whether the second egress PE is to receive the multicast traffic (reference number 440). For example, egress PE 225-3 may provide second acknowledgement information, associated with the segmented tunnel, that includes information indicating whether egress PE 225-3 is to receive the multicast traffic in a manner similar to that described above with regard to the operation at reference number 430. For the purposes of example process 400, assume that egress PE 225-3 provides second acknowledgement information indicating that egress PE 225-3 is interested in receiving the multicast traffic (e.g., that a leaf count value in the type 4 route provided by egress PE 225-3 is set to 1).

As further shown in FIG. 4, process 400 may include determining a number of egress PEs, associated with an area of the service provider network, that are receive the multicast traffic (reference number 445). For example, ABR 235-1 may determine a number of egress PEs 225, associated with area 240-2, that are to receive the multicast traffic. In some implementations, ABR 235-1 may determine the number of egress PEs 225, associated with area 240-2, that are to receive the multicast traffic after egress PEs 225 associated with area 240-2 (e.g., egress PE 225-2 and egress PE 225-3) provide the first acknowledgement information and the second acknowledgement information, respectively. Additionally, or alternatively, ABR 235-1 may determine the number of egress PEs 225, associated with area 240-2, that are to receive the multicast traffic at another time, such as when a timer, associated with ABR 235-1, satisfies a threshold, as described below.

In some implementations, ABR 235-1 may determine the number of egress PEs 225, associated with area 240-2, that are to receive the multicast traffic, based on acknowledgement information provided by egress PEs 225 associated with area 240-2. For example, based on the first acknowledgement information (e.g., including a leaf count value set to 1), and the second acknowledgement information (e.g., including a leaf count value set to 1), ABR 235-1 may determine that two egress PEs 225 (e.g., egress PE 225-2 and egress PE 225-3), associated with area 240-2, are to receive the multicast traffic.

In some implementations, ABR 235-1 may determine the number of egress PEs 225 that are to receive the multicast traffic based on egress PEs 225, associated with area 240-2, providing acknowledgement information. For example, ABR 235-1 may count the number of interested egress PEs 225 as ABR 235-1 receives the acknowledgement information from egress PEs 225 associated with area 240-2.

Additionally, or alternatively, ABR 235-1 may determine the number of egress PEs 225 that are to receive the multicast traffic based on a timer configured on ABR 235-1. For example, ABR 235-1 may start a timer when ABR 235-1 provides the modified segmented P-tunnel initiation information. Here, if ABR 235-1 does not receive acknowledgement information from an egress PE 225 to which the modified segmented P-tunnel initiation information was sent before the timer reaches a threshold (e.g., 10 seconds, 30 seconds, etc.), then ABR 235-1 may determine that the egress PE 225 for which acknowledgement information has not been received, is not interested in receiving the multicast traffic. Alternatively, ABR 235-1 may determine that the egress PE 225 for which acknowledgement has not been received is interested in receiving the multicast traffic.

In some implementations, ABR 235-1 may determine an updated number of egress PEs 225 that are to receive the multicast traffic (e.g., at a later time), based on updated acknowledgement information provided by egress PE 225-2 and/or egress PE 225-3, as described above.

As further shown in FIG. 4, process 400 may include providing third acknowledgement information, associated with the segmented tunnel, that includes information that identifies the number of egress PEs that are to receive the multicast traffic (reference number 450). For example, ABR 235-1 may provide third acknowledgement information that identifies the number of egress PEs 225 that are to receive the multicast traffic. In some implementations, ABR 235-1 may provide the third acknowledgement information when ABR 235-1 determines the number of egress PEs 225, associated with area 240-2, that are to receive the multicast traffic.

In some implementations, the third acknowledgement information may include a type 4 route that identifies the number of egress PEs 225 that are interested in receiving the multicast traffic. For example, the third acknowledgement information may include a leaf count value that is set to a value that corresponds to the number of egress PEs 225 that are to receive the traffic (e.g., the leaf count value may be set to 2 to indicate that egress PE 225-2 and egress PE 225-3 are interested in receiving the multicast traffic, the leaf count value may be set to 1 to indicate that only egress PE 225-2 is interested in receiving the multicast traffic, etc.).

In some implementations, ABR 235-1 may provide updated third acknowledgement information. For example, when ABR 235-1 receives updated first acknowledgement information or updated second acknowledgement information, as described above, ABR 235-1 may provide updated third acknowledgement information that identifies (e.g., via the leaf count value) an updated number of egress PEs 225 that are to receive the multicast traffic. In some implementations, ABR 235-1 may provide the updated acknowledgement information based on a timer associated with ABR 235-1. For example, ABR 235-1 may start a timer upon providing the third acknowledgement information. Here, ABR 235-1 may provide updated third acknowledgement information when the timer reaches a threshold (e.g., 10 minutes, one hour, etc.). In this way, transient problems and/or issues that cause egress PEs 225 to (e.g., temporarily) change interest in receiving the multicast traffic may not cause repetitive switching between providing the multicast traffic via a segmented P-tunnel and providing the multicast traffic via a non-segmented P-tunnel, thereby conserving resources (e.g., network resources, processing resources, etc.) that may be consumed due to such repetitive switching.

In some implementations, ABR 235-1 may provide the third acknowledgement information to ingress PE 215. In some implementations, ABR 235-2 may also determine and provide, to ingress PE 215, acknowledgement information that identifies a number of egress PEs 225, associated with area 240-3 (e.g., including egress PE 225-4 and egress PE 225-5), that are to receive the multicast traffic. Similarly, egress PE 225-1 may provide acknowledgement information indicating whether egress PE 225-1 is to receive the multicast traffic (e.g., since egress PE 225 is included in area 240-1, the acknowledgement information may not be provided via an ABR 235).

As further shown in FIG. 4, process 400 may include determining a total number of egress PEs that are to receive the multicast traffic (reference number 455). For example, ingress PE 215 may determine a total number of egress PEs 225 that are to receive the multicast traffic. In some implementations, ingress PE 215 may determine the total number of egress PEs 225 that are to receive the multicast traffic when ingress PE 215 receives the third acknowledgement information provided by ABR 235-1, the acknowledgement information provided by ABR 235-2, and/or the acknowledgement information provided by egress PE 225-1.

In some implementations, the total number of egress PEs 225 may correspond to a number of egress PEs 225, associated with multiple areas 240 (e.g., all areas 240 of the service provider network), that are to receive the multicast traffic. In some implementations, ingress PE 215 may determine the total number of egress PEs 225 that are to receive the multicast traffic by combining (e.g., adding) the number of egress PEs 225, associated with each area 240, that are to receive the multicast traffic.

In some implementations, ingress PE 215 may determine an updated total number of egress PEs 225 that are to receive the multicast traffic. For example, ingress PE 215 may determine an updated total number of egress PEs 225 when one or more devices (e.g., ABR 235-1, ABR 235-2, egress PE 225-1, etc.) provide updated acknowledgement information that identifies an updated number of egress PEs 225 that are to receive the traffic, as described above.

As further shown in FIG. 4, process 400 may include selectively continuing to provide the multicast traffic via the segmented tunnel based on the total number of egress PEs that are to receive the multicast traffic (reference number 460). For example, ingress PE 215 may selectively continue to provide the multicast traffic via the segmented P-tunnel based on the total number of egress PEs 225 that are to receive the multicast traffic. In some implementations, ingress PE 215 may selectively continue to provide the multicast traffic via the segmented P-tunnel when ingress PE 215 determines the total number of egress PEs 225 that are to receive the traffic. Additionally, or alternatively, ingress PE 215 may selectively continue to provide the multicast traffic via the segmented P-tunnel when ingress PE 215 determines an updated total number of egress PEs 225 that are to receive the traffic.

In some implementations, ingress PE 215 may selectively continue to provide the multicast traffic via the segmented P-tunnel based on the total number of egress PEs 225 that are interested in receiving the multicast traffic and/or based on the updated total number of egress PEs 225 that are interested in receiving the multicast traffic. For example, assume that ingress PE 215 initiates a non-segmented P-tunnel to provide the multicast traffic, and determines, based on a first total number of type 4 routes provided by egress PEs 225 satisfying a segmenting threshold, that a segmented P-tunnel is to be used to transfer the multicast traffic. During initiation of the segmented P-tunnel (e.g., as described by process 400), ingress PE 215 may determine a second total number of egress PEs 225 that also satisfies the segmenting threshold. In other words, at a first time (e.g., immediately after initiating the segmented P-tunnel), ingress PE 215 may determine that the number of interested egress PEs 225 still satisfies the segmenting threshold. Here, ingress PE 215 may determine that ingress PE 215 is to continue to provide the multicast traffic via the segmented P-tunnel based on the second total number of egress PEs 225 satisfying the segmenting threshold.

At a later time, ingress PE 215 may determine (e.g., based on updated acknowledgement information) a third total number of egress PEs 225 that are interested in receiving the multicast traffic. Here, assume that the third total number of egress PEs 225 does not satisfy the segmenting threshold. In other words, at the later time, the number of interested egress PEs 225 may decrease such that the number of interested egress PEs 225 is less than the segmenting threshold. Here, ingress PE 215 may determine that ingress PE 215 is not to continue to provide the multicast traffic via the segmented P-tunnel since the third total number of egress PEs 225 does not satisfy the segmenting threshold. In this example, ingress PE 215 may reinitiate a non-segmented P-tunnel for providing the multicast traffic.

In some implementations, after initiating a segmented P-tunnel, ingress PE 215 may continue determining whether to reinitiate the segmented P-tunnel as a non-segmented P-tunnel. Similarly, after switching the segmented P-tunnel back to a non-segmented P-tunnel, ingress PE 215 may continue determining whether to reinitiate the non-segmented P-tunnel as a segmented P-tunnel.

Although FIG. 4 shows example steps of process 400, in some implementations, process 400 may include additional steps, fewer steps, different steps, or differently arranged steps than those depicted in FIG. 4. Additionally, or alternatively, two or more of the steps of process 400 may be performed in parallel.

FIG. 5 is a flow chart of an example process 500 for selectively continuing to provide multicast traffic using a segmented tunnel based on a total number of egress PEs interested in receiving multicast traffic. In some implementations, one or more process blocks of FIG. 5 may be performed by ingress PE 215. In some implementations, one or more process blocks of FIG. 5 may be performed by another device or a group of devices separate from or including ingress PE 215, such as on or more other devices of environment 200.

As shown in FIG. 5, process 500 may include determining that a segmented tunnel is to be used to transfer multicast traffic across a service provider network (step 510). For example, ingress PE 215 may determine that a segmented P-tunnel is to be used to transfer multicast traffic across a service provider network, as described above with regard to example process 400.

As further shown in FIG. 5, process 500 may include providing tunnel initiation information associated with the segmented tunnel (block 520). For example, ingress PE 215 may provide tunnel initiation information associated with the segmented P-tunnel, as described above with regard to example process 400.

As further shown in FIG. 5, process 500 may include receiving acknowledgment information associated with the segmented tunnel (block 530). For example, ingress PE 215 may receive acknowledgment information, associated with the segmented P-tunnel, as described above with regard to example process 400. In some implementations, ingress PE 215 may receive the acknowledgment information from one or more egress PEs 225, ABRs 235, or the like, as described above.

As further shown in FIG. 5, process 500 may include determining a total number of egress PEs that are to receive the multicast traffic (block 540). For example, ingress PE 215 may determine a total number of egress PEs 225 that are to receive the multicast traffic, as described above with regard to example process 400.

As further shown in FIG. 5, process 500 may include selectively continuing to provide the multicast traffic via the segmented tunnel based on the total number of egress PEs that are to receive the multicast traffic (block 550). For example, ingress PE 215 may selectively continue to provide the multicast traffic via the segmented P-tunnel based on the total number of egress PEs 225 that are to receive the multicast traffic, as described above with regard to example process 400.

As an example, ingress PE 215 may determine that the total number of egress PEs 225 that are to receive the multicast traffic does not satisfy the segmenting threshold. Here, ingress PE 215 may reinitiate the segmented P-tunnel as a non-segmented P-tunnel and provide the multicast traffic via the non-segmented P-tunnel.

As another example, ingress PE 215 may determine that the total number of egress PEs 225 that are to receive the multicast traffic satisfies the segmenting threshold. Here, ingress PE 215 may continuing providing the multicast traffic via the segmented P-tunnel.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may allow an ingress PE to determine a number of egress PEs, interested in receiving multicast traffic, after a segmented P-tunnel has been initiated to transfer the multicast traffic. As such, the ingress PE may be capable of determining whether to reinitiate the P-tunnel as a non-segmented P-tunnel, or continue using the segmented P-tunnel for transfer of the multicast traffic. In this way, an amount of resources, associated with transferring the multicast traffic via the P-tunnel, may be used efficiently.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
an interface; and
one or more processors, communicatively coupled to the interface, to:
provide information associated with initiating a segmented tunnel to be used to transfer multicast traffic via a network covering a plurality of areas;
receive first acknowledgement information associated with the segmented tunnel,
the first acknowledgement information including information that identifies a first quantity of egress devices, associated with a first area of the plurality of areas, that are to receive the multicast traffic;
receive second acknowledgement information associated with the segmented tunnel,
the second acknowledgement information including information that identifies a second quantity of egress devices, associated with a second area of the plurality of areas, that are to receive the multicast traffic,
the second area being different from the first area;
determine, based on the first acknowledgement information and the second acknowledgement information, a total quantity of egress devices that are to receive the multicast traffic; and
selectively provide the multicast traffic via the segmented tunnel based on the total quantity of egress devices that are to receive the multicast traffic.

2. The device of claim 1, where the one or more processors are further to:
determine whether the total quantity of egress devices satisfies a segmenting threshold; and
selectively provide the multicast traffic via the segmented tunnel based on determining whether the total quantity of egress devices satisfies the segmenting threshold.

3. The device of claim 1, where the one or more processors, when selectively providing the multicast traffic via the segmented tunnel, are to:
provide the multicast traffic via the segmented tunnel; or
reinitiate the segmented tunnel as a non-segmented tunnel and provide the multicast traffic via the non-segmented tunnel.

4. The device of claim 1, where the one or more processors are further to:

receive, after providing at least some of the multicast traffic via the segmented tunnel, updated acknowledgement information associated with the segmented tunnel,
the updated acknowledgement information including information that identifies an updated quantity of egress devices, associated with the first area or the second area, that are to receive the multicast traffic;
determine, based on the updated acknowledgement information, an updated total quantity of egress devices that are to receive the multicast traffic; and
selectively continue to provide the multicast traffic via the segmented tunnel based on the updated total quantity of egress devices that are to receive the multicast traffic.

5. The device of claim 1, where the one or more processors are further to:
determine that the segmented tunnel is to be used to transfer the multicast traffic via the network; and
provide the information associated with initiating the segmented tunnel based on determining that the segmented tunnel is to be used to transfer the multicast traffic via the network.

6. The device of claim 1, where the first acknowledgement information includes a type 4 route that includes the information that identifies the first quantity of egress devices that are to receive the multicast traffic.

7. The device of claim 1, where the information associated with initiating the segmented tunnel includes a segment next hop identifier.

8. A non-transitory computer-readable medium storing instructions, the instructions comprising:
one or more instructions that, when executed by one or more processors, cause the one or more processors to:
provide initiation information associated with a segmented tunnel to be used to transfer multicast traffic via a network that spans a plurality of areas;
receive first acknowledgement information, associated with the segmented tunnel, that includes information that identifies a first quantity of egress provider edge (PE) devices, associated with A first area of the plurality of areas, that are interested in receiving the multicast traffic;
receive second acknowledgement information associated with the segmented tunnel,
the second acknowledgement information including information that identifies a second quantity of egress PE devices, associated with a second area of the plurality of areas, that are to receive the multicast traffic,
the second area being different from the first area;
determine, based on the first acknowledgement information and the second acknowledgement information, a total quantity of egress PE devices that are interested in receiving the multicast traffic; and
determine whether to provide the multicast traffic via the segmented tunnel based on the total quantity of egress PE devices that are interested in receiving the multicast traffic.

9. The non-transitory computer-readable medium of claim 8, where the one or more instructions, when executed by the one or more processors, further cause the one or more processors to:
determine whether the total quantity of egress PE devices satisfies a threshold; and
determine whether to provide the multicast traffic via the segmented tunnel based on determining whether the total quantity of egress PE devices satisfies the threshold.

10. The non-transitory computer-readable medium of claim 8, where the one or more instructions, that cause the one or more processors to determine whether to provide the multicast traffic via the segmented tunnel, further cause the one or more processors to:
provide the multicast traffic via the segmented tunnel; or
reinitiate the segmented tunnel as a non-segmented tunnel and provide the multicast traffic via the non-segmented tunnel.

11. The non-transitory computer-readable medium of claim 8, where the one or more instructions, when executed by the one or more processors, further cause the one or more processors to:
receive updated acknowledgement information associated with the segmented tunnel,
the updated acknowledgement information including information that identifies an updated quantity of egress PE devices, associated with the first area or the second area, that are interested in receiving the multicast traffic;
determine, based on the updated acknowledgement information, an updated total quantity of egress PE devices that are interested in receiving the multicast traffic; and
determine whether to provide the multicast traffic via the segmented tunnel based on the updated total quantity of egress PE devices that are interested in receiving the multicast traffic.

12. The non-transitory computer-readable medium of claim 8, where the one or more instructions, when executed by the one or more processors, further cause the one or more processors to:
determine that the segmented tunnel is to be used to transfer the multicast traffic via the network; and
provide the initiation information associated with the segmented tunnel based on determining that the segmented tunnel is to be used to transfer the multicast traffic via the network.

13. The non-transitory computer-readable medium of claim 8, where the segmented tunnel is a selective P-tunnel.

14. The non-transitory computer-readable medium of claim 8, where the initiation information associated with the segmented tunnel includes a segment next hop identifier.

15. A method, comprising:
providing, by device, information associated with a segmented tunnel associated with transferring traffic via a network,
the network covering a plurality of areas;
receiving, by the device and based on providing the information associated with the segmented tunnel, first information that identifies a first quantity of devices, associated with a first area of the plurality of areas, that are to receive the traffic;
receiving second information that identifies a second quantity of devices, associated with a second area of the plurality of areas, that are to receive the traffic,
the second area being different from the first area;
determining, by the device and based on the first information and the second information, a total quantity of devices that are to receive the traffic; and
selectively providing, by the device, the traffic via the segmented tunnel based on the total quantity of devices that are to receive the traffic.

16. The method of claim 15, where selectively providing the traffic via the segmented tunnel comprises:
   determining that the total quantity of devices satisfies a threshold; and
   providing the traffic via the segmented tunnel based on determining that the total quantity of devices satisfies the threshold.

17. The method of claim 15, where selectively providing the traffic via the segmented tunnel comprises:
   determining that the total quantity of devices does satisfy a threshold;
   reinitiating the segmented tunnel as a non-segmented tunnel; and
   providing the traffic via the non-segmented tunnel.

18. The method of claim 15, further comprising:
   receiving information that identifies an updated quantity of devices, associated with the first area or the second area, that are to receive the traffic;
   determining, based on the updated quantity of devices, an updated total quantity of devices that are to receive the traffic; and
   selectively providing the traffic via the segmented tunnel based on the updated total quantity of devices that are to receive the traffic.

19. The method of claim 15, further comprising:
   determining that the segmented tunnel is to be used to transfer the traffic via the network; and
   providing the information associated with the segmented tunnel based on determining that the segmented tunnel is to be used to transfer the traffic via the network.

20. The method of claim 15, where the information associated with the segmented tunnel is a type 3 route that includes information associated with initiating the segmented tunnel.

* * * * *